United States Patent
Nakamura et al.

(10) Patent No.: US 6,215,270 B1
(45) Date of Patent: Apr. 10, 2001

(54) SYNCHRONOUS CONTROL DEVICE

(75) Inventors: Hiroshi Nakamura; Shigeru Futami, both of Fukuoka (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/319,309

(22) PCT Filed: Oct. 16, 1997

(86) PCT No.: PCT/JP97/03746

§ 371 Date: Jul. 29, 1999

§ 102(e) Date: Jul. 29, 1999

(87) PCT Pub. No.: WO98/25191

PCT Pub. Date: Jun. 11, 1998

(30) Foreign Application Priority Data

| Dec. 4, 1996 | (JP) | 8-340536 |
| Dec. 9, 1996 | (JP) | 8-346604 |

(51) Int. Cl.[7] ............... H02P 1/46; H02P 3/18; H02P 5/28; H02P 7/36

(52) U.S. Cl. ............ 318/700; 318/705; 318/609; 318/268

(58) Field of Search ............... 318/700–724, 318/592, 66–85, 268, 609, 610

(56) References Cited

U.S. PATENT DOCUMENTS

| 4,565,950 | 1/1986 | Kikuno ............... 318/85 |
| 4,743,825 | * 5/1988 | Nashiki ............... 318/723 |
| 5,119,287 | * 6/1992 | Nakamura et al. ....... 364/148 |
| 5,696,672 | 12/1997 | Tsuruta et al. ........ 364/148 |
| 5,726,878 | 3/1998 | Nakamura et al. ....... 364/164 |
| 5,834,912 | 11/1998 | Nakamura et al. ....... 318/268 |

FOREIGN PATENT DOCUMENTS

| 3340527 A1 | 5/1984 | (DE) . |
| 59-87515 | 5/1984 | (JP) . |
| 59-98216 | 6/1984 | (JP) . |
| 59-201116 | 11/1984 | (JP) . |
| 407028508 | * 1/1995 | (JP) ............ G05B/17/02 |
| 7-200062 | 8/1995 | (JP) . |
| 8-126375 | 5/1996 | (JP) . |
| 408126375 | * 5/1996 | (JP) ............ H02P/5/46 |
| 8-241126 | 9/1996 | (JP) . |
| 409289788 | * 11/1997 | (JP) ............ H02P/5/46 |

* cited by examiner

Primary Examiner—Robert E. Nappi
Assistant Examiner—Edgardo San Martin
(74) Attorney, Agent, or Firm—Morgan, Lewis & Bockius LLP (57) ABSTRACT

There is provided a synchronous control apparatus of high synchronous control accuracy, and the synchronous control accuracy is seldom deteriorated even if input of the position command and detection of the main shaft position are delayed. The synchronous control apparatus comprises a command generating device, a main shaft device, and a subsidiary shaft device. The command generating device includes a memory for storing the main shaft position command increments inputted into a plurality of time points from the past to the present, an output means for outputting the main shaft position command increment $\Delta r_s(i)$ inputted before (M−1) times of samplings in the values stored in the memory, a memory for storing the main shaft position increments inputted into a plurality of time points from the past to the present, a calculator for finding prediction values of a plurality of main shaft position increments for several times of future samplings by the dynamic characteristic model of the main shaft device including the delay of d times of samplings and also by the stored main shaft position command increments and the main shaft position increment, and a converter for finding a plurality of subsidiary shaft future position command increments by a plurality of prediction values of the main shaft position increments obtained by the calculator.

8 Claims, 3 Drawing Sheets

SYNCHRONOUS CONTROL DEVICE

TECHNICAL FIELD

The present invention relates to a synchronous control apparatus for driving a subsidiary shaft motor synchronously with a main shaft motor.

BACKGROUND ART

According to the conventional synchronous control technique, a command is synchronously provided to the main shaft motor control device and the subsidiary shaft motor control device, respectively. Alternatively, a command is provided to the subsidiary shaft motor control device synchronously with the present position of the main shaft motor. Further, the present applicant proposed a synchronous control apparatus in which the predictive control is applied to the synchronous control as disclosed in Japanese Patent Application No. 6-288994. In the synchronous control apparatus described above, predictive control is conducted on the subsidiary shaft by a future position command of the subsidiary shaft obtained by predicting a future position of the main shaft.

However, according to the conventional synchronous control technique, it is difficult to conduct synchronous control with high accuracy because the dynamic characteristic of the main shaft is different from that of the subsidiary shaft. The art disclosed in Japanese Patent Application No. 6-288994 is proposed in order to solve the above problem and to enhance the synchronous accuracy. However, the following problems may be encountered hen the above device is used. In this device, when the future main shaft position is predicted, not the main shaft position command of the future but the main shaft position command at the present moment is used. Therefore, when the main shaft position command is changed, control can not be changed in quick response, and the synchronous accuracy is deteriorated.

According to the conventional synchronous control technique, when input of the position command into the main shaft control device and the subsidiary shaft control device is delayed or when detection of the main shaft position is delayed, the synchronous accuracy is deteriorated in accordance with the delay.

The present invention has been accomplished to solve the above problems. It is an object of the present invention to provide a synchronous control apparatus capable of realizing synchronous control, the control accuracy of which is higher than that of the conventional apparatus. Further, synchronous accuracy of this synchronous control apparatus is not deteriorated even if input of the position command is delayed and also detection of the main shaft position is delayed.

SUMMARY OF THE INVENTION

In order to solve the above problems, there is provided a synchronous control apparatus by which a subsidiary shaft motor is driven synchronously with a main shaft motor, comprising: a command generating device into which an increment of the main shaft position command $\Delta r_s(i+M-1)$ in the sampling period is inputted and also an increment of the main shaft position $\Delta y_s(i-K)$ before K ($K \geq 0$) times of the samplings is inputted, and from which an increment of the main shaft position command $\Delta r_s(i)$ is outputted and also a plurality of increments of the subsidiary shaft future position $\Delta r_s(i+m)$, $m=D+, D+2, \ldots, D+M$, which are for several times of future samplings are outputted; a main shaft device into which a signal of the main shaft position command increment $\Delta r_s(i-d)$ delayed by d ($d \geq 0$) times of samplings is inputted for controlling the drive of the main shaft motor, and from which an increment of the main shaft position $\Delta y_s(i)$ is outputted; and a subsidiary shaft device into which signals $\Delta r_s(i+m)$, $m=1, 2, \ldots, M$ of the plurality of subsidiary shaft future position command increment delayed by D ($D \geq 2\ 0$) times of samplings are inputted, and which controls the drive of the subsidiary shaft motor so that the subsidiary shaft position predicted by the dynamic characteristic model of the subsidiary shaft can be made to coincide with the future position command of the subsidiary shaft, wherein the command generating device includes: first memory means for storing the main shaft position command increments inputted into a plurality of time points from the past to the present; output means for outputting the main shaft position command increment $\Delta r_s(i)$ inputted before (M−1) times of samplings in the values stored in the first memory means; second memory means for storing the main shaft position increments inputted into a plurality of time points from the past to the present; a calculator for finding predicted values of a plurality of main shaft position increments for several times of future samplings by the dynamic characteristic model of the main shaft device including delay factor which is d times of samplings and also by the stored main shaft position command increments and the stored main shaft position increments; and a converter for finding a plurality of subsidiary shaft future position command increments by a plurality of predicted values of the main shaft position increments obtained by the calculator.

According to the present invention, there is also provided a synchronous control apparatus for driving a subsidiary motor synchronously with a main motor comprising: a fine adjustment device for inputting a signal into the subsidiary shaft motor control device as a fine adjustment signal for adjusting the asynchronization, the signal obtained by adding a signal, in which an increment of the main shaft position in the sampling period or the predicted value is multiplied by a multiplier $K_1$, to a signal, in which the main shaft position command increment is multiplied by a multiplier $K_2$,; and means for switching the value of the multiplier $K_1$ according to the positive or negative of the main shaft position increment.

According to the present invention, there is also provided a synchronous control apparatus by which a subsidiary shaft motor is driven synchronously with a main shaft motor, comprising: a command generating device including: a memory means into which an increment of the main shaft position command $\Delta r_s(i+M-1)$ in the sampling period is inputted and also an increment of the main shaft position $\Delta y_s(i-K)$ before K ($K \geq 0$) times of samplings is inputted; the memory means respectively storing the inputted main shaft position command increment and the main shaft position increment; an output means for outputting the main shaft position command increment $\Delta r_s(i)$ inputted before (M−1) times of samplings in- the values stored in the memory means; a calculator for finding predicted values of a plurality of main shaft position increments for several times of future samplings; and a converter for finding and outputting a plurality of subsidiary shaft future position command increments $\Delta r_s(i+m)$, $m=D, D+1, D+2, \ldots, D+M$ by a plurality of predicted values of the main shaft position increments obtained by the calculator; a main shaft device into which a signal $\Delta r_s(i-d)$ of the main shaft position command increment delayed with d ($d \geq 0$) times of samplings is inputted for controlling the drive of the main shaft motor, and from which an increment of the main shaft position $\Delta y_s(i)$ is outputted; a subsidiary shaft device into which signals $\Delta r_z(i+m)$, m=0, 1, ..., M of the plurality of subsidiary shaft future position command increment delayed by D (D≧0) times of samplings are inputted, and which controls the drive of the subsidiary shaft motor so that the subsidiary shaft position predicted by the dynamic characteristic model of the subsidiary shaft can be made to coincide with the future position command of the subsidiary shaft; and a fine adjustment device for inputting a signal delayed by D (D≧0) times of samplings of a signal obtained by adding a signal, in which one of the increment of the main shaft position and the predicted value is multiplied, to a signal, in which the main shaft position command increment is multiplied, into the subsidiary shaft motor control device as a fine adjustment signal for adjusting the asynchronization, wherein the calculator of the command generating device includes: means for calculating and storing the main shaft position command $r_s$ by the main shaft position command increment $\Delta r_s$ stored in the memory means; means for calculating and storing the main shaft position $y_s$ by the main shaft position increment $\Delta r_y$ stored in the memory means; and means for determining the predicted value $\Delta y_s^*(i+m)$ of the main shaft position increment by the equation of $$y_s*\left(\frac{i+m}{i}\right) = \sum_{n=K}^{N_a+K} A_{mn}y_s(i-n) + \sum_{n=1}^{N_b+K+m} B_{mn}r_s(i+m-n)$$

$$\Delta y_s*(i+D) = y_s*\left(\frac{i+D}{i}\right) - y_s*\left(\frac{i-1+D}{i-1}\right)$$

$$m = D$$

$$\Delta y_s*(i+m) = y_s*\left(\frac{i+m}{i}\right) - y_s*\left(\frac{i+m-1}{i}\right)$$

$$m = D+1, D+2, \ldots, D+M$$

$$y_s*\left(\frac{i_2}{i_1}\right)$$

is a predicted value of the main shaft position at the time $i_2$ which is predicted at the time $i_1$, and $N_a$, $N_b$, $A_{mn}$ and $B_{mn}$ are constants found by the dynamic characteristic model of the main shaft device.

DETAILED DESCRIPTION OF THE PREFERRED EMBODIMENTS

Referring to the accompanying drawings, embodiments of the present invention will be explained below.

Figure 1:
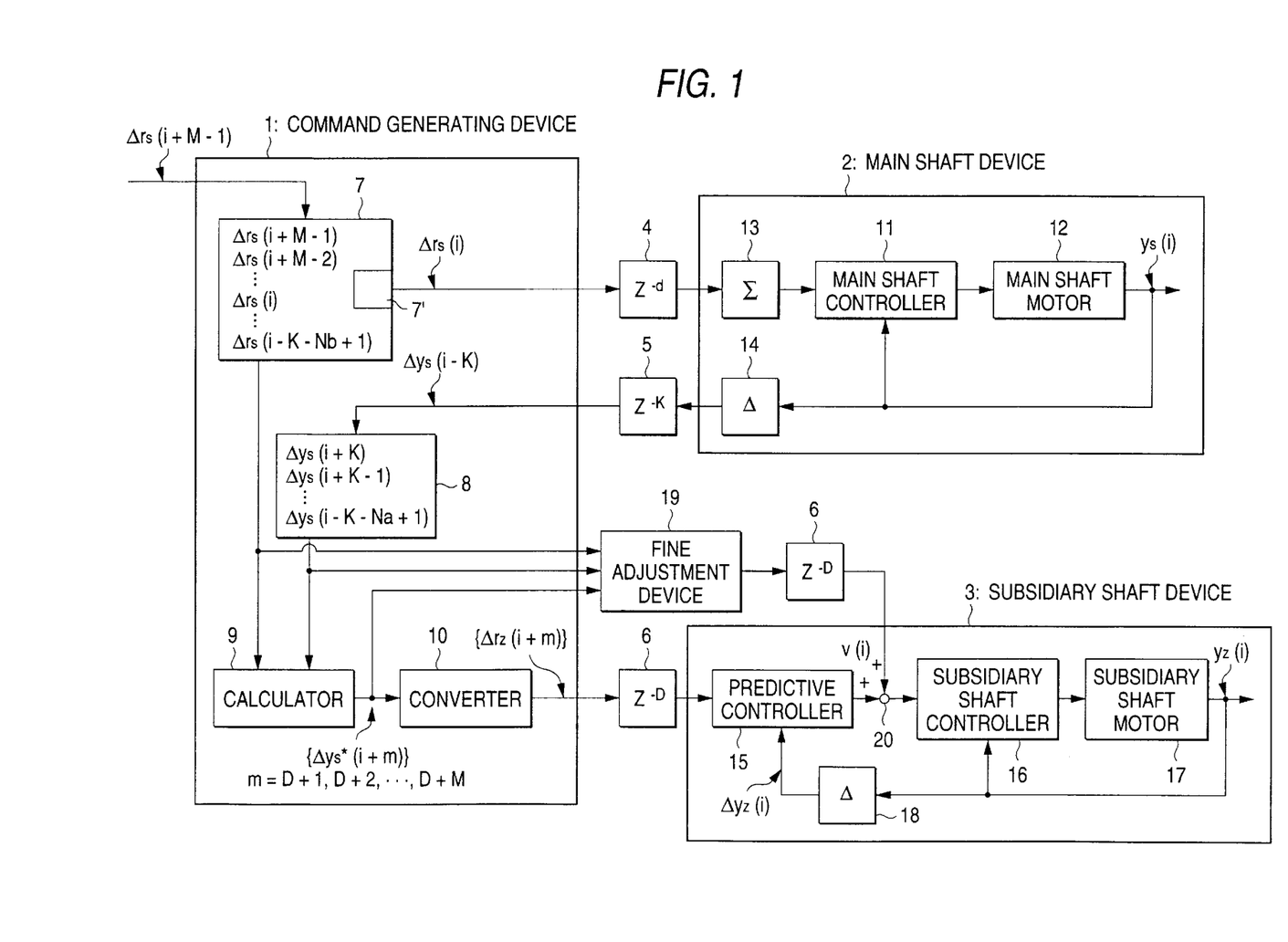
FIG. 1 is a block diagram showing a configuration of the synchronous control apparatus according to the first embodiment of the present invention.

FIG. 1 is a block diagram showing a configuration of the synchronous control apparatus according to the first embodiment of the present invention.

In FIG. 1, at the present moment $i_1$ an increment $\Delta r_s(i+M-1)$ in the sampling period of the main shaft position command and an increment $\Delta y_s(i-K)$ of the main shaft position at the sampling of K (K≧0) times before are inputted into the command generating device 1, and the command generating device 1 outputs an increment $\Delta r_s(i)$ of the main shaft position command at the present moment and a plurality of increments $\Delta r_z(i+m)$, m=D+1, D+2, ..., D+M of the subsidiary shaft future position command, which are for several times of future samplings. In this case, the mark Δ represents an increment in the sampling period.

In the command generating device 1, the memory 7 stores main shaft position command increments which have been inputted into a plurality of time points from the past to the present. The output means 7' outputs a main shaft position command increment $\Delta r_s(i)$, which has been inputted at sampling of (M−1) times before, out of the values stored in the memory 7, as a main shaft position command increment at the present moment. The memory 8 stores main shaft position increments which have been inputted into a plurality of time points from the past to the present. The calculator 9 finds prediction values $\Delta y_s^*(i+m)$, m=D+1, D+2, ..., D+M of a plurality of main shaft position increments for several times of future samplings by the dynamic characteristic model of the main shaft device 2 including the delay factor 4 and also by the stored main shaft position command increments and the main shaft position increment. The converter 10 finds a plurality of subsidiary shaft future position command increments $\Delta r_z(i+m)$, m=D+1, D+2, ..., D+M by a plurality of prediction values of the main shaft position increments obtained by the calculator. For example, when the movement of the main shaft and that of the subsidiary shaft are similar to each other, the converter 10 can be realized by a multiplier by which a constant is multiplied.

The delay factors 4, 5 and 6 are inherent to the processes of transmission, calculation and detection when the position command increment and the main shaft position increment are transmitted between the devices. Concerning the main shaft position command increment $\Delta r_s(i)$ is inputted into the main shaft device 2 as $\Delta r_s(i-d)$ by the delay of d (d≧0) times of the samplings according to the delay factor 4.

In the main shaft device 2, the integrator 13 finds the main shaft position command $r_s(i-d)$ by the inputted main shaft position command increment $\Delta r_s(i-d)$. The main shaft position command $r_s(i-d)$ is inputted into the main shaft controller 11, and the main shaft controller 11 controls the position $y_s(i)$ of the main shaft motor 12 according to the inputted value. A difference device 14 finds the increment $\Delta y_s(i)$ by the main shaft position $y_s(i)$. The main shaft position increment $\Delta y_s(i)$ is outputted from the main shaft device 2 and changed into $\Delta y_s(i-K)$ by the delay of K (K≧0) times of the samplings according to the delay factor 5 and then inputted into the command generating device 1.

A plurality of subsidiary shaft future position command increments are delayed by D (D≧0) times of the samplings according to the delay factor 6 and $\Delta r_z(i+m)$, m=1, 2, ..., M are inputted into the subsidiary shaft device 3.

In the subsidiary shaft device 3, the subsidiary shaft controller 16 controls a speed of the subsidiary shaft motor 17 according to the inputted speed command. The difference device 18 finds the increment $\Delta y_z(i)$ by the position $y_z(i)$ of the subsidiary motor shaft 17. The predictive controller 15 determines the speed command v(i) by predictive control so that the position of the subsidiary shaft for several times of future samplings, which has been predicted by the dynamic characteristic model of the subsidiary shaft motor 17 including the subsidiary shaft controller 16 and also predicted by the subsidiary shaft position increment $\Delta y_z(i)$, can be made to coincide with the subsidiary shaft future position commands $r_z(i+m)$, $m=1, 2, \ldots, M$ which are determined by a plurality of subsidiary shaft future position command increments $\Delta r_z(i+m)$, $m=1, 2 \ldots, M$. In the case where the predictive controller disclosed in Japanese Patent Application No. 5-197956 is used for this predictive controller 15 the speed command $v(i)$ is determined by the following equation.

$$v(i) = \sum_{m=1}^{M_z} v_m \Delta r_z(i+m) - \sum_{n=0}^{N_{az}-1} p_n \Delta y_z(i-n) + Ee(i) - \sum_{n=1}^{N_{bz}-1} g_n v(i-n) \quad (1)$$

where $M_z$ is a prediction horizon, $e(i)$ is a positional deviation ($=r_z(i)-y_z(i)$), $N_{az}$, $N_{bz}$ are degrees of the dynamic characteristic model of the subsidiary shaft, and $v_m, p_n, E, g_n$ are constants for predictive control.

The speed command $v(i)$ found by the predictive control is added by the adder 20 to an output signal of a fine adjustment device 19 which is delayed by D (D≧0) times of the samplings from the $v(i)$, and the thus added value is inputted into the subsidiary shaft controller 16 as a speed command.

The fine adjustment device 19 outputs a signal in which the signal $K_2 \Delta r_s$, which is obtained when the main shaft position command increment $\Delta r_s$ stored in the memory 7 of the command generating device 1 is multiplied by a multiplier, and the signal $K_1 \Delta y_s$ obtained by multiplying the main shaft position increment $\Delta y_s$ (or $K_1 \Delta y_s^*$ obtained by multiplying the prediction value $\Delta y_s^*$ of the main shaft position increment) stored in the memory 8 of the command generating device 1 by a multiplier, are added to each other. In this case, the multipliers $K_1$ and $K_2$ are variable, and can be used for fine adjustment of asynchronization.

The calculator 9 provided in the command generating device 1 will be explained below.

The calculator 9 includes: means for calculating and storing the main shaft position commands $r_s(i+M-1)$, $r_s(i+M-2), \ldots, r_s(i-K-N_b)$ by the main shaft position command increment $\Delta r_s$ stored in the memory 7; means for calculating and storing the main shaft positions $y_s(i-K), y_s(i-K-1), \ldots, y_s(i-K-N_a)$ by the main shaft position increment $\Delta y_s$ stored in the memory 8; and means for determining the prediction value $\Delta y_s^*(i+m)$, $m=D+1, D+2, \ldots, D+M$ of the main shaft position increment by the following equation according to the main shaft position command $r_s$ and the main shaft position $y_s$ which are stored in these means.

$$\left. \begin{array}{l} y_s*(i+m) = \sum_{n=K}^{N_a+K} A_{mn} y_s(i-n) + \sum_{n=1}^{N_b+K+m} B_{mn} r_s(i+m-n) \\ \Delta y_s*(i+m) = y_s*(i+m) - y_s*(i+m-1) \end{array} \right\} \quad (2)$$

In this case, $N_a$, $N_b$, $A_{mn}$ and $B_{mn}$ are constants found by the dynamic characteristic model of the main shaft device 2 including the delay factor 4.

The calculator 9 may be configured by: means for determining the prediction value $\Delta y_s^*(i+m)$, $m=D+1, D+2, \ldots, D+M$ of the main shaft position increment by the following equation according to the main shaft position command increment $\Delta r_s$ and the main shaft position increment $\Delta y_s$ which are stored in the memories 7 and 8.

$$\Delta y_s * (i+m) = \sum_{n=K}^{N_a+K-1} A_{mn} \Delta y_s(i-n) + \sum_{n=1}^{N_b+K+m-1} B_{mn} \Delta r_s(i+m-n) \quad (3)$$

In this case, $N_a$, $N_b$, $A_{mn}$ and $B_{mn}$ are constants found by the dynamic characteristic model of the main shaft device 2 including the delay factor 4.

The calculator 9 may be configured by: means for calculating and storing the main shaft position commands $r_s(i+M-1), r_s(i+M-2), \ldots, r_s(i-K-N_b+1)$ by the main shaft position command increment $\Delta r_s$ stored in the memory 7; and means for determining the prediction value $\Delta y_s^*(i+m)$, $m=D+1, D+2, \ldots, D+M$ of the main shaft position increment by the following equation according to the main shaft position command $r_s$ and the main shaft position increment $\Delta y_s$ which is stored in the memory 8.

$$\Delta y_s * (i+m) = \sum_{n=K}^{N_a+K-1} A_{mn} \Delta y_s(i-n) + \sum_{n=1}^{N_b+K+m-1} B_{mn} \Delta r_s(i+m-n) \quad (4)$$

In this case, $N_a$, $N_b$, $A_{mn}$ and $B_{mn}$ are constants found by the dynamic characteristic model of the main shaft device 2 including the delay factor 4.

First, equation (2) is introduced. If a transfer function model from the main shaft position command $r_s(i)$ to the main shaft position $y_s(i)$ is obtained by the discrete-time system expressed by the equation of:

$$G_{ry}(z) = \frac{b_1 Z^{-1} + \cdots + b_{N_b} Z^{-N_b}}{1 - a_1 Z^{-1} - \cdots - a_{N_a} Z^{-N_a}}, \quad (5)$$

the input and output model can be expressed by the following equation.

$$\hat{y}_s(i) = \sum_{n=1}^{N_a} a_n \hat{y}_s(i-n) + \sum_{n=1}^{N_b} b_n r_s(i-n) \quad (6)$$

At the time i, the measured value $y_s(i-n)$ ($n \geq K$) of the main shaft position to the time (i−K) is obtained. Therefore, the model estimate of the main shaft position after that can be expressed by the following equation.

The model estimate $\hat{y}_s(i+m)$ ($m \geq -K+1$) is expressed by the measured values as follows.

$$\hat{y}_s(i-K+1) = \sum_{n=1}^{N_a} a_n y_s(i-K+1-n) + \sum_{n=1}^{N_b} b_n r_s(i-K+1-n) \quad (7a)$$

$$m = -K+1$$

$$\hat{y}_s(i+m) = \quad (7b)$$

$$\sum_{n=1}^{m+K-1} a_n \hat{y}_s(i+m-n) + \sum_{n=m+K}^{N_a} a_n y_s(i+m-n) + \sum_{n=1}^{N_b} b_n r_s(i+m-n)$$

$$m > -K+1$$

Therefore, the following equation can be obtained.

$$y_s(i+m) = \sum_{n=K}^{m+K-1} \hat{a}_{mn} y_s(i-n) + \sum_{n=1}^{N_b+K+m-1} \hat{b}_{mn} r_s(i+m-n) \quad (8)$$

-continued
$$m \geq -K + 1$$

In this case, the coefficients $\hat{a}_{mn}, \hat{b}_{mn}$ can be given by the following equations.

$$\begin{aligned}
\hat{a}_{(-K+1)n} &= a_{(n-K+1)n} & m = -K+1, K \leq n \leq N_a + K - 1 \\
\hat{a}_{mn} &= \sum_{j=1}^{m+K-1} a_j \hat{a}_{(m-j)n} + a_{(n+m)} & m > -K+1, K \leq n \leq N_a + K - 1 \\
\hat{b}_{(-K+1)n} &= b_n & m = -K+1, 1 \leq n \leq N_b \\
\hat{b}_{mn} &= \sum_{j=1}^{m+K-1} a_j \hat{b}_{(m-j)(n-j)} + b_n & m > -K+1, 1 \leq n \leq N_b + \\
& & K + m - 1
\end{aligned} \quad (9)$$

here, $a_n = 0 (n > N_a)$, $b_n = 0 (n > N_b)$, $\hat{b}_{mn} = 0 (n < 1)$.

When the main shaft position after the time (i–K) is predicted by the following equation, the above equation (2) can be obtained $$y_s * (i + m) = \qquad (10)$$
$$y_s(i+m) + \left\{ y_s(i-K) - \sum_{n=1}^{N_a} a_n y_s(i-K-n) - \sum_{n=1}^{N_b} b_n r_s(i-K-n) \right\}$$
$$m \geq -K + 1$$

In this case, the coefficients $A_{mn}$ and $B_{mn}$ are given by the following equation and the equation (9).

$$\begin{aligned}
A_{mK} &= 1 + \hat{a}_{mK} & n = K \\
A_{mn} &= \hat{a}_{mn} - a_{(n-K)} & K + 1 \leq n \leq N_a + K \\
B_{mn} &= \hat{b}_{mn} - b_{(n-K-m)} & 1 \leq n \leq N_b + K + m
\end{aligned} \quad (11)$$

here, $b_n = 0 (n < 1)$, $\hat{a}_{m(N_a+K)} = \hat{b}_{m(N_b+K+m)} = 0$.

Next, the equation (3) is introduced. If the transfer function model from the main shaft position command increment $\Delta r_s(i)$ to the main shaft position increment $\Delta y_s(i)$ is obtained by the discrete-time system expressed by the following equation, $$G_{dd}(z) = \frac{b_1 Z^{-1} + \cdots + b_{N_b} Z^{-N_b}}{1 - a_1 Z^{-1} - \cdots - a_{N_a} Z^{-N_a}} \qquad (12)$$

the input and output model can be expressed as follows.

$$\Delta \hat{y}_s(i) = \sum_{n=1}^{N_a} a_n \Delta \hat{y}_s(i-n) + \sum_{n=1}^{N_b} b_n \Delta r_s(i-n) \qquad (13)$$

At the time i, the measured value $\Delta y_s(i-n)$ ($n \geq K$) of the main shaft position increment to the time (i–K) is obtained. Therefore, when the main shaft position increment after that is predicted using the measured values by the following equation, the above equation (3) can be obtained.

$$\Delta y_s * (i - K + 1) = \qquad (14a)$$
$$\sum_{n=1}^{N_a} a_n \Delta y_s(i-K+1-n) + \sum_{n=1}^{N_b} b_n \Delta r_s(i-K+1-n)$$
$$m = -K + 1$$

$$\Delta y_s * (i + m) = \sum_{n=1}^{m+K-1} a_n \Delta y_s * (i+m-n) + \qquad (14b)$$
$$\sum_{n=m+K}^{N_a} a_n \Delta y_s(i+m-n) + \sum_{n=1}^{N_b} b_n \Delta r_s(i+m-n)$$
$$m > -K + 1$$

In this case, the coefficients $A_{mn}$ and $B_{mn}$ are given by the following equations.

$$\begin{aligned}
A_{(-K+1)n} &= a_{(n-K+1)} & m = -K+1, K \leq n \leq N_a + K - 1 \\
A_{mn} &= \sum_{j=1}^{m+K-1} a_j A_{(m-j)n} + a_{(n+m)} & m > -K+1, K \leq n \leq N_a + K - 1 \\
B_{(-K+1)n} &= b_n & m = -K+1, 1 \leq n \leq N_b \\
B_{mn} &= \sum_{j=1}^{m+K-1} a_j B_{(m-j)(n-j)} + b_n & m > -K+1, 1 \leq n \leq N_b + \\
& & K + m - 1
\end{aligned} \quad (15)$$

here, $a_n = 0 (n > N_a)$, $b_n = 0 (n > N_b)$, $B_{mn} = 0 (n < 1)$.

Next, the equation (4) is introduced. If the transfer function model from the main shaft position command $r_s(i)$ to the main shaft position increment $\Delta y_s(i)$ is obtained by the discrete-time system expressed by the following equation, $$G_{rd}(z) = \frac{b_1 Z^{-1} + \cdots + b_{N_b} Z^{-N_b}}{1 - a_1 Z^{-1} - \cdots - a_{N_a} Z^{-N_a}} \qquad (16)$$

the input and output model can be expressed as follows.

$$\Delta \hat{y}_s(i) = \sum_{n=1}^{N_a} a_n \Delta \hat{y}_s(i-n) + \sum_{n=1}^{N_b} b_n r_s(i-n) \qquad (17)$$

At the time i, the measured value $\Delta y_s(i-n)$ ($n \geq K$) of the main shaft position increment to the time (i–K) is obtained. Therefore, when the main shaft position increment after that is predicted using the measured values by the following equation, the above equation (4) can be obtained.

$$\Delta y_s * (i - K + 1) = \qquad (18a)$$
$$\sum_{n=1}^{N_a} a_n \Delta y_s(i-K+1-n) + \sum_{n=1}^{N_b} b_n r_s(i-K+1-n)$$
$$m = -K + 1$$

$$\Delta y_s * (i + m) = \sum_{n=1}^{m+K-1} a_n \Delta y_s * (i+m-n) + \qquad (18b)$$
$$\sum_{n=m+K}^{N_a} a_n \Delta y_s(i+m-n) + \sum_{n=1}^{N_b} b_n r_s(i+m-n)$$
$$m > -K + 1$$

In this case, the coefficients $A_{mn}$ and $B_{mn}$ are given by the following equations.

$$\left.\begin{array}{ll} A_{(-K+1)n} = a_{(n-K+1)} & m = -K+1, K \le n \le N_a + K - 1 \\ A_{mn} = \sum_{j=1}^{m+K-1} a_j A_{(m-j)n} + a_{(n+m)} & m > -K+1, K \le n \le N_a + K - 1 \\ B_{(-K+1)n} = b_n & m = -K+1, 1 \le n \le N_b \\ B_{mn} = \sum_{j=1}^{m+K-1} a_j B_{(m-j)(n-j)} + b_n & m > -K+1, 1 \le n \le N_b + \\ & K + m - 1 \end{array}\right\} \quad (19)$$

here, $a_n=0(n>N_a)$, $b_n=0(n>N_b)$ $B_{mn}=0(n<1)$.

When the sampling periods of the main shaft device 2 and the subsidiary shaft device 3 are 1/n of that of the command generating device 1, the inputted position command increment may be multiplied by the multiplier of 1/n.

As described above, the synchronous control apparatus of the first embodiment comprises: a command generating device 1; a main shaft device 2; and a subsidiary shaft device 3, and further the command generating device 1 includes: a memory 7 for storing the main shaft position command increments inputted into a plurality of time points from the past to the present; an output means 7' for outputting the main shaft position command increment $\Delta r_s(i)$ inputted at sampling of (M−1) times before out of the values stored in the memory 7; a memory 8 for storing the main shaft position increments inputted into a plurality of time points from the past to the present; a calculator 9 for finding prediction values of a plurality of main shaft position increments for several times of future samplings by the dynamic characteristic model of the main shaft device including the delay corresponding to d times of the samplings and also by the stored main shaft position command increments and the main shaft position increment; and a converter 10 for finding a plurality of subsidiary shaft future position command increments by a plurality of prediction values of the main shaft position increments obtained by the calculator. Due to the above arrangement, it is possible to realize a synchronous control of high accuracy. Further, it is possible to provide a synchronous control apparatus, the accuracy of synchronization of which is not deteriorated even if the input of the position command and the detection of the main shaft position are delayed.

Figure 2:
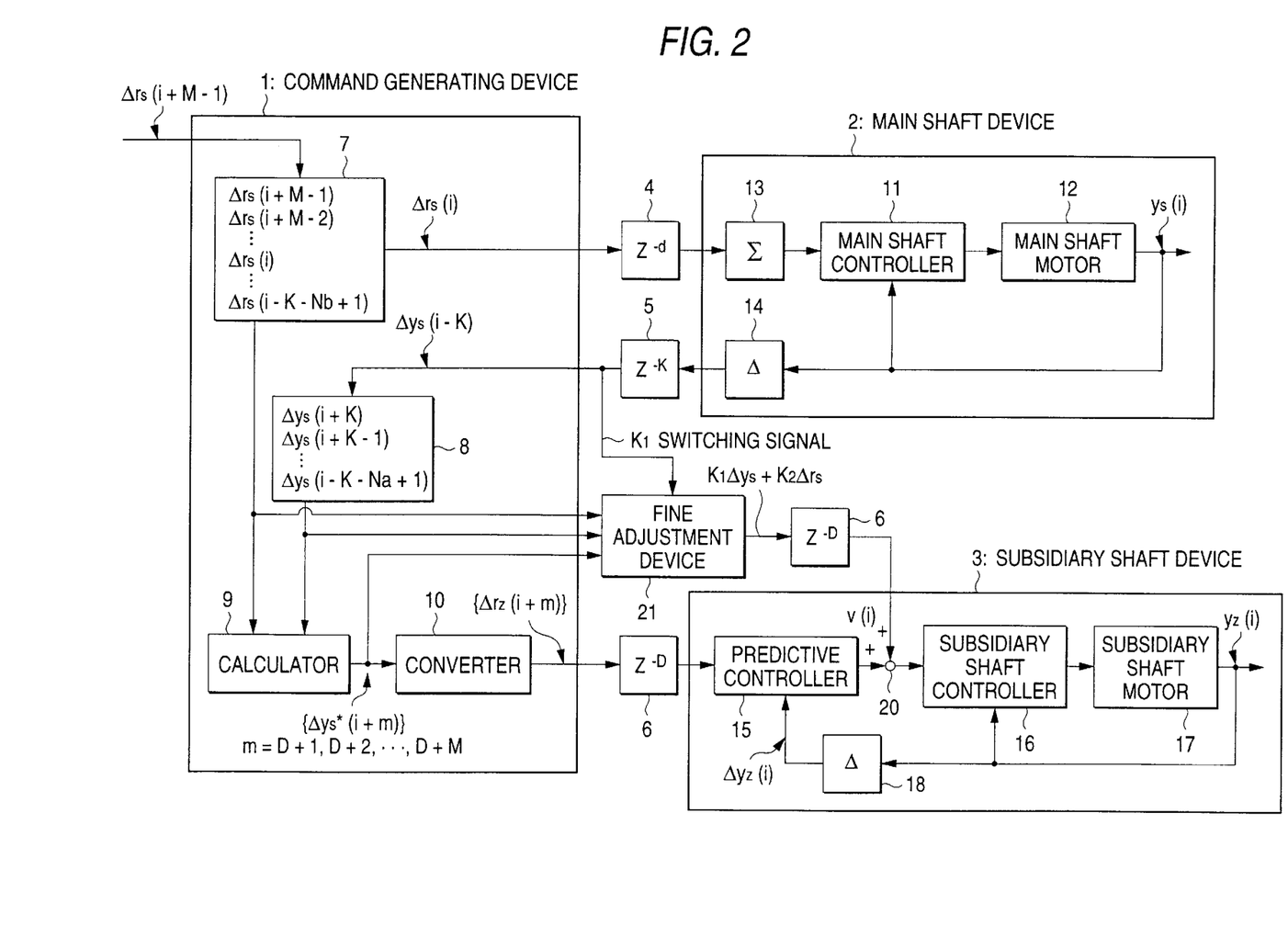
FIG. 2 is a block diagram showing a configuration of the synchronous control apparatus according to the second embodiment of the present invention.

FIG. 2 is a block diagram showing a configuration of the synchronous control apparatus according to the second embodiment of the present invention. Same reference numerals are used to indicate common parts in FIGS. 1 and 2. In the synchronous control apparatus of the first embodiment, there is a possibility that the accuracy of synchronization is deteriorated when the dynamic characteristic of the main shaft in the case of normal rotation and that in the case of reverse rotation are different from each other. In order to solve the above problems, the synchronous control apparatus of the second embodiment includes a fine adjustment device 21 having a function of changing over the multiplier $K_1$ according to the positive and the negative of the main position increment $\Delta y_s$.

The fine adjustment device 21 outputs a signal obtained when the signal $K_2 \Delta r_s$, which is obtained by multiplying the main shaft position command increment $\Delta r_s$ stored in the memory 7 of the command generating device 1 by a multiplier, and the signal $K_1 \Delta y_s$ obtained by multiplying the main shaft position increment $\Delta y_s$ (or $K_1 \Delta y_s^*$ obtained by multiplying the prediction value $\Delta y_s^*$ of the main shaft position increment) stored in the memory 8 of the command generating device 1 by a multiplier, are added to each other. As described above, the multipliers $K_1$ and $K_2$ are, parameters used for fine adjustment of asynchronization. These multipliers $K_1$ and $K_2$ are previously stored in the fine adjustment device 21 in the process of adjustment. Especially, concerning the multiplier $K_1$, two types of multipliers $K_{1P}$ and $K_{1N}$ are stored so that they can be used in the normal and the reverse rotation of the main shaft. When the main shaft position increment $\Delta y_s(i-K)$ is not less than zero, the multiplier $K_{1P}$ is used, and when the main shaft position increment $\Delta y_s(i-K)$ is negative, the multiplier $K_{1N}$ is used.

Setting of $K_{1P}$ and $K_{1N}$ is conducted as follows. First, the adjustment is conducted under the condition that the main shaft is rotated normally, and the multiplier $K_{1P}$ for normal rotation is set and stored. Next, the adjustment is conducted again under the condition that the main shaft is rotated reversely, and the multiplier $K_{1N}=K_{1P}+K_{PN}$ for reverse rotation is set and stored. In this case, $K_{PN}$ is a coefficient used for correcting a difference of the dynamic characteristic of the main shaft. $K_{1N}$ may be calculated by the above equation while $K_{PN}$ is stored instead of $K_{1N}$. In this connection, $K_2$ is set so that the asynchronization can be reduced when the main shaft is in an accelerating and decelerating condition.

As described above, the second embodiment includes a fine adjustment device 21 for inputting a signal, which is obtained when a signal, in which the increment in the sampling period of the main shaft position or the prediction value is multiplied by the multiplier of $K_1$, and a signal, in which the main shaft position command increment is multiplied by the multiplier of $K_2$, are added to each other, into the subsidiary shaft motor control device as a fine adjustment signal for adjusting the asynchronization. In this case, two types of multipliers $K_1$ are stored and changed over according to the positive and negative of the main shaft position increment. Due to the foregoing, even if the dynamic characteristic of the main shaft in the case of normal rotation and that in the case of reverse rotation are different from each other, it is possible to provide a synchronous control apparatus, the accuracy of synchronization of which is not deteriorated.

Figure 3:
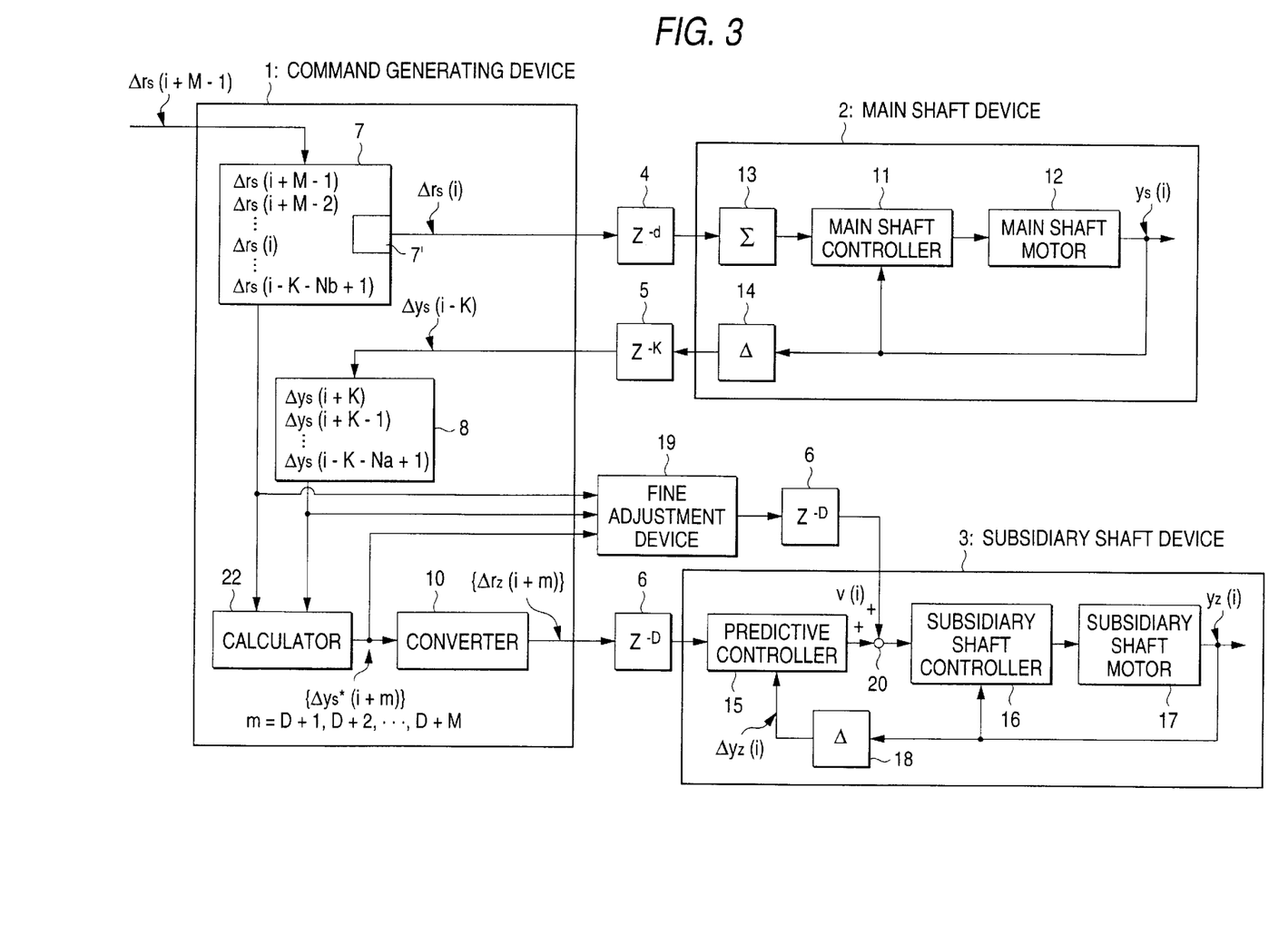
FIG. 3 is a block diagram showing a configuration of the synchronous control apparatus according to the third embodiment of the present invention.

FIG. 3 is a block diagram showing a configuration of the synchronous control apparatus according to the third embodiment of the present invention. Same reference numerals are used to indicate common parts in FIGS. 1 and 3.

In the synchronous control apparatus of the first embodiment, there is a possibility that the prediction accuracy of the main shaft position increment is somewhat deteriorated by the torque saturation or disturbance torque. In order to solve the above problems, in the synchronous control apparatus of the third embodiment, a prediction value, which was found in the sampling of 1 time before, is considered when the prediction value of the main shaft position increment is found.

In FIG. 3, at the present moment i, an increment $\Delta r_s(i+M-1)$ in the sampling period of the main shaft position command and an increment $\Delta y_s(i-K)$ of the main shaft position at the sampling of K (K≧0) times before are inputted into the command generating device 1, and the command generating device 1 outputs an increment $\Delta r_s(i)$ of the main shaft position command at the present moment and a plurality of increments $\Delta r_s(i+m)$, m=D+1, D+2, . . . , D+M of the subsidiary shaft future position command, which are for several times of future samplings, are outputted from the command generating device 1.

The calculator 22 finds a plurality of prediction values $\Delta y_s^*(i+m)$, m=D, D+1, D+2, . . . , D+M of the main shaft position increment for several times of future samplings by the dynamic characteristic model of the main shaft device 2 including the delay factor 4 and also by the stored main shaft position command increment and the main shaft position increment. The converter 10 finds a plurality of subsidiary shaft future position command increments $\Delta r_z(i+m)$, m=D, D+1, D+2, ..., D+M by the prediction values of a plurality of main shaft position increments which have been obtained.

A plurality of subsidiary shaft future position command increments are delayed by D (D≧0) times of samplings according to the delay factor 6, and $\Delta r_z(i+m)$, m=0, 1, 2, ..., M are inputted into the subsidiary shaft device 3. The predictive controller 15 determines the speed command v(i) by predictive control so that the position of the subsidiary shaft for several times of future samplings, which has been predicted by the dynamic characteristic model of the subsidiary shaft motor 17 including the subsidiary shaft controller 16 and also predicted by the subsidiary shaft position increment $\Delta y_z(i)$, can be made to coincide with the subsidiary shaft future position commands $r_z(i+m)$, m=1, 2, ..., M which are determined by a plurality of subsidiary shaft future position command increments $\Delta r_z(i+m)$, m=1, 2, ..., M. In the case where the predictive controller disclosed in Japanese Patent Application No. 5-197956 is used for this predictive controller 15, the speed command v(i) is determined by the following equation.

$$v(i) = \sum_{m=1}^{M_z} v_m \Delta r_z(i+m) - \sum_{n=0}^{N_{az}-1} p_n \Delta y_z(i-n) + Ee(i) - \sum_{n=1}^{N_{bz}-1} g_n v(i-n) \quad (20)$$

where $M_z$ is a prediction horizon, e(i) is a positional deviation(=$r_z(i)-y_z(i)$), $N_{az}$, $N_{bz}$ are degrees of the dynamic characteristic model of the subsidiary shaft, and $v_m$, $p_n$, E, $g_n$ are constants for predictive control.

The speed command v(i) found by the predictive control is added by the adder 20 to an output signal of a fine adjustment device 19 which is delayed by D (D≧0) times of the samplings from the v(i), and the thus added value is inputted into the subsidiary shaft controller 16 as a speed command.

The fine adjustment device 19 outputs a signal in which the signal $K_2\Delta r_s$, which is obtained when the main shaft position command increment $\Delta r_s$ stored in the memory 7 of the command generating device 1 is multiplied by a multiplier, and the signal $K_1\Delta y_s$ obtained by multiplying the main shaft position increment $\Delta y_s$ (or $K_1\Delta y_s^*$ obtained by multiplying the prediction value $\Delta y_s^*$ of the main shaft position increment) stored in the memory 8 of the command generating device 1 by a multiplier, are added to each other. In this case, the multipliers $K_1$ and $K_2$ are variable, and can be used for fine adjustment of asynchronization.

The calculator 22 includes: means for calculating and storing the main shaft position commands $r_s(i+M-1)$, $r_s(i+M-2)$, ..., $r_s(i-K-N_b)$ by the main shaft position command increment $\Delta r_s$ stored in the memory 7; means for calculating and storing the main shaft positions $y_s(i-K)$, $y_s(i-K-1)$, ..., $y_s(i-K-N_a)$ by the main shaft position increment $\Delta y_s$ stored in the memory 8; and means for determining the prediction value $\Delta y_s^*(i+m)$, m=D+1, D+2, ..., D+M of the main shaft position increment by the following equation according to the main shaft position command $r_s$ and the main shaft position $y_s$ which are stored in these means.

$$y_s*\left(i+\frac{m}{i}\right) = \sum_{n=K}^{N_a+K} A_{mn}y_s(i-n) + \sum_{n=1}^{N_b+K+m} B_{mn}r_s(i+m-n) \quad (21)$$

$$\Delta y_s*(i+D) = \Delta y_s*\left(i+\frac{D}{i}\right) - \Delta y_s*\left(i-1+\frac{D}{i-1}\right) \quad (22a)$$

$$m = D$$

$$\Delta y_s*(i+m) = \Delta y_s*\left(i+\frac{m}{i}\right) - \Delta y_s*\left(i+m-\frac{1}{i}\right) \quad (22b)$$

$$m = D+1, D+2, ..., D+M$$

here, $$y_s*\left(\frac{i_2}{i_1}\right)$$

is a predicted value of the main shaft position at the time $i_2$ which is predicted at the time $i_1$.

When the discrete-time system expressed by the equation of $$G_{ry}(z) = \frac{b_1 Z^{-1} + \cdots + b_{N_b} Z^{-N_b}}{1 - a_1 Z^{-1} - \cdots - a_{N_a} Z^{-N_a}}, \quad (23)$$

is used as a transfer function model from the main shaft position command $r_s(i)$ to the main shaft position $y_s(i)$, the coefficients $A_{mn}$ and $B_{mn}$ can be given by the following equations in the same manner as that of the synchronous control apparatus of the first embodiment.

$$\left.\begin{array}{ll} A_{mK} = 1 + \hat{a}_{mK} & n = K \\ A_{mn} = \hat{a}_{mn} - a_{(n-K)} & K+1 \leq n \leq N_a + K \\ B_{mn} = \hat{b}_{mn} - b_{(n-K-m)} & 1 \leq n \leq N_b + K + m \end{array}\right\} \quad (24)$$

here, $b_n=0(n<1)$, $\hat{a}_{m(N_a+K)}=\hat{b}_{m(N_b+K+m)}=0$.

$$\left.\begin{array}{ll} \hat{a}_{(-K+1)n} = a_{(n-K+1)} & m = -K+1, K \leq n \leq N_a+K-1 \\ \hat{a}_{mn} = \sum_{j=1}^{m+K-1} a_j \hat{a}_{(m-j)n} + a_{(n+m)} & m > -K+1, K \leq n \leq N_a+K-1 \\ \hat{b}_{(-K+1)n} = b_n & m = -K+1, 1 \leq n \leq N_b \\ \hat{b}_{mn} = \sum_{j=1}^{m+K-1} a_j \hat{b}_{(m-j)(n-j)} + b_n & m > -K+1, 1 \leq n \leq N_b + \\ & K+m-1 \end{array}\right\} \quad (25)$$

here, $a_n=0(n>N_a)$, $b_n=0(n>N_b)$, $\hat{b}_{mn}=0(n<1)$.

As described above, the synchronous control apparatus of the third embodiment includes: a command generating device 1 for finding and outputting the subsidiary shaft future position command increment $\Delta r_z$ by the predicted value of the main shaft position increment; a main shaft device 2 for outputting the main shaft position increment $\Delta y_s$; a subsidiary shaft device 3 for conducting the predictive control on the subsidiary shaft motor 17; and a fine adjustment device 19 for inputting a fine adjustment signal to correct the asynchronization into the subsidiary shaft device 3, wherein the predicted value of the main shaft position increment is determined by the calculator 22 according to the predicted value of the main shaft position which has been predicted at the time (i−1) before one sampling. Due to the foregoing, it is possible to provide a synchronous control apparatus, the prediction accuracy of the main shaft position increment of which is not deteriorated by the torque saturation or the disturbance torque.

As described above, it is possible for the present invention to provide a synchronous control apparatus capable of conducting a synchronous motion of an accuracy higher than that of the prior art irrespective of the delay of input of the position command increment and also irrespective of the delay of detection of the main shaft position increment.

According to the present invention, it is possible to correct a difference between the dynamic characteristic in the case of normal rotation of the main shaft and the dynamic characteristic in the case of reverse rotation. Therefore, it is possible to realize a synchronous control apparatus capable of conducting a synchronous motion, the accuracy of which is higher than that of the synchronous control apparatus of the prior art.

According to the present invention, when the predicted value of the main shaft position increment is found, the predicted value which was found in the past by one sampling is considered. Therefore, the accuracy of prediction of the main shaft position increment is enhanced to be higher than that of the conventional apparatus. As a result, it is possible to realize a synchronous control apparatus, the accuracy of synchronous motion of which is higher than that of the prior art.

What is claimed is:

1. A synchronous control apparatus by which a subsidiary shaft motor is driven synchronously with a main shaft motor, comprising:

a command generating device into which an increment of the main shaft position command $\Delta r_s(i+M-1)$ of a $(i+M-1)$th sampling period is inputted and also an increment of the main shaft position $\Delta y_s(i-K)$, with K $(K \geq 0)$, of a $(i-K)$th sampling period is inputted, and from which an increment of the main shaft position command $\Delta r_s(i)$ of a present sampling period is outputted and also a plurality of increments of the subsidiary shaft future position command $\Delta r_z(i+m)$, with $m=D+1, D+2, \ldots, D+M$, of corresponding future sampling periods are outputted;

a main shaft device into which a signal of the main shaft position command increment $\Delta r_s(i-d)$ is inputted after being delayed by d $(d \geq 0)$ sampling periods for controlling the drive of the main shaft motor, and from which an increment of the main shaft position $\Delta y_s(i)$ is outputted; and a subsidiary shaft device into which signals $\Delta r_z(i+m)$, with $m=1, 2, \ldots, M$, of the plurality of subsidiary shaft future position command increment are inputted after being delayed by D $(D \geq 0)$ sampling periods, and which controls the drive of the subsidiary shaft motor so that the subsidiary shaft position predicted by the dynamic characteristic model of the subsidiary shaft can be made to coincide with the future position command of the subsidiary shaft, wherein i is a present time, M is a number of sampling periods into the future, and K is a number of sampling periods into the past, and wherein the command generating device includes:

first memory means for storing the main shaft position command increments inputted corresponding to a plurality of time points from the past to the present, output means for outputting the main shaft position command increment $\Delta r_s(i)$ inputted $(M-1)$ sampling periods earlier and stored in the first memory means;

second memory means for storing the main shaft position increments inputted corresponding to a plurality of time points from the past to the present;

a calculator for finding a plurality of predicted values of main shaft position increments for a plurality of future sampling periods according to the dynamic characteristic model of the main shaft device including delay factor of d sampling periods and also according to the stored main shaft position command increments and the stored main shaft position increments; and a converter for finding a plurality of subsidiary shaft fixture position command increments according to the plurality of predicted values of the main shaft position increments obtained by the calculator.

2. The synchronous control apparatus as set forth in claim 1, wherein the calculator of the command generating device includes:

means for calculating and storing the main shaft position command $r_s$ by the main shaft position command increment $\Delta r_s$ stored in the first memory means;

means for calculating and storing the main shaft position $y_s$ by the main shaft position increment $\Delta y_s$ stored in the second memory means; and means for determining the predicted values $\Delta y_s^*(i+m)$, $m=D+1, D+2, \ldots, D+M$ of the main shaft position increment by the main shaft position command $r_s$ and the main shaft position $y_s$ stored in these means, by the equations of $$y_s*(i+m) = \sum_{n=K}^{N_a+K} A_{mn} y_s(i-n) + \sum_{n=1}^{N_b+K+m} B_{mn} r_s(i+m-n)$$

$\Delta y_s^*(i+m) = y_s^*(i+m) - y_s^*(i+m-1)$ here, $N_a$, $N_b$, $A_{mn}$ and $B_{mn}$ are constants found by the dynamic characteristic model of the main shaft device.

3. The synchronous control apparatus as set forth in claim 1, wherein the calculator of the command generating device including:

means for determining the predicted values $\Delta y_s^*(i+m)$, $m=D+1, D+2, \ldots, D+M$ of the main shaft position increment by the main shaft position command increment $\Delta r_s$ stored in the first memory means and the main shaft position increment $\Delta_{ys}$ stored in the second memory means, by the equation of $$\Delta y_s*(i+m) = \sum_{n=K}^{N_a+K-1} A_{mn} \Delta y_s(i-n) + \sum_{n=1}^{N_b+K+m-1} B_{mn} \Delta r_s(i+m-n)$$

here, $N_a$, $N_b$, $A_{mn}$ and $B_{mn}$ are constants found by the dynamic characteristic model of the main shaft device.

4. The synchronous control apparatus as set forth in claim 1, wherein the calculator of the command generating device includes:

means for calculating and storing the main shaft position command $r_s$ by the main shaft position command increment $\Delta r_s$ stored in the first memory means; and means for determining the predicted values $\Delta y_s^*(i+m)$, $m=D+1, D+2, \ldots, D+M$ of the main shaft position increment by the main shaft position command $r_s$ stored in the means and also by the main shaft position increment $\Delta y_s$ stored in the second memory means, by the equation of $$\Delta y_s*(i+m) = \sum_{n=K}^{N_a+K-1} A_{mn}\Delta y_s(i-n) + \sum_{n=1}^{N_b+K+m-1} B_{mn}y_s(i+m-n)$$

here, $N_a$, $N_b$, $A_{mn}$ and $B_{mn}$ are constants found by the dynamic characteristic model of the main shaft device.

5. The synchronous control apparatus as set forth in claim 1, further comprising:

means for adding a signal obtained by multiplying the main shaft position command increment $\Delta r_s$ stored in the first memory means of the command generating device to a signal obtained by multiplying one of the main shaft position increment $\Delta y_s$ stored in the second memory means and a predicted value $\Delta y_s*$ of the main shaft position increment obtained by the calculator;

means for adding a signal of the added value delayed by D (D≧0) times of samplings to the calculated predictive control value in the subsidiary shaft device; and means for finely adjusting the synchronization by changing the multipliers.

6. A synchronous control apparatus for driving a subsidiary motor synchronously with a main motor comprising:

a fine adjustment device for inputting a signal into a subsidiary shaft motor control device as a fine adjustment signal for adjusting the synchronization of the subsidiary motor, the signal obtained by adding a signal, in which an increment of the main shaft position in the sampling period or the predicted value is multiplied by a multiplier $K_1$, to a signal, in which the main shaft position command increment is multiplied by a multiplier $K_2$; and means for switching the value of the multiplier $K_1$ according to the positive or negative of the main shaft position increment.

7. The synchronous control apparatus as set forth in claim 6, wherein the switching means has a value of multiplier $K_1$ in the case of normal rotation of the main shaft and also the switching means has a value of multiplier $K_1$ in the case of reverse rotation of the main shaft, the value of normal rotation of the main shaft is selected when the main shaft position increment is not lower than zero, and the value of reverse rotation of the main shaft is selected when the main shaft position increment is negative.

8. A synchronous control apparatus by which a subsidiary shaft motor is driven synchronously with a main shaft motor, comprising:

a command generating device including:

a memory means into which an increment of the main shaft position command $\Delta r_s(i+M-1)$ of a (i+M-1)th sampling period and an increment of the main shaft position $\Delta y_s(i-K)$, with K(K≧0), of an (i-K)th sampling period are inputted, the memory means respectively storing the inputted main shaft position command increment and the main shaft position increment, an output means for outputting the main shaft position command increment $\Delta r_s(i)$ of a present sampling period inputted (M−1) sampling periods earlier into the memory means, a calculator for finding a plurality of predicted values of main shaft position increments for a plurality of future sampling periods, and a converter for finding and outputting a plurality of subsidiary shaft future position command increments $\Delta r_z(i+m)$, with m=D, D+1, D+2, . . . , D+M, according to the plurality of predicted values of the main shaft position increments obtained by the calculator wherein i is a present time, M is a number of sampling periods into the future, and K is a number of sampling periods into the past, and;

a main shaft device into which a signal $\Delta r_s(i-d)$ of the mail shaft position command increment delayed d (d≧0) sampling periods is inputted for a controlling the drive of the main shaft motor, and from which an increment of the main shaft position $\Delta y_s(i)$ is outputted;

a subsidiary shaft device into which signals $\Delta r_z(i+m)$, with m=0, 1, . . . , M, of the plurality of subsidiary shaft future position command increment delayed D (D≧0) sampling periods are inputted, and which controls the drive of the subsidiary shaft motor so that the subsidiary shaft position predicted according to the dynamic characteristic model of a subsidiary shaft can be made to coincide with the future position command of the subsidiary shaft; and a fine adjustment device for inputting a fine adjustment signal delayed D (D≧0) sampling periods for adjusting a synchronization of the subsidiary shaft motor control device, the fine adjustment signal obtained by adding a first signal in which one of the increment of the main shaft position and the predicted value is multiplied by a first multiplier with a second signal in which the main shaft position command increment is multiplied by a second multiplier, wherein the calculator of the command generating device includes:

means for calculating and storing the main shaft position command $r_s$ according to the main shaft position command increment $\Delta r_s$ stored in the memory means;

means for calculating and storing the main shaft position $y_s$ according to the main shaft position increment $\Delta y_s$ stored in the memory means; and means for determining the predicted value $\Delta y_s*(i+m)$ of the main shaft position increment according to the equations of $$y_s*\left(\frac{i+m}{i}\right) = \sum_{n=K}^{N_a+K} A_{mn}y_s(i-n) + \sum_{n=1}^{N_b+K+m} B_{mn}r_s(i+m-n)$$

$$\Delta y_s*(i+D) = y_s*\left(\frac{i+D}{i}\right) - y_s*\left(\frac{i-1+D}{i-1}\right)$$

$$m = D$$

$$\Delta y_s*(i+m) = y_s*\left(\frac{i+m}{i}\right) - y_s*\left(\frac{i+m-1}{i}\right)$$

$$m = D+1, D+2, \ldots, D+M$$

here, $y_s*(i_2/i_1)$ is a predicted value of the main shaft position at the time $i_2$ which is predicted at the time $i_1$ and $N_a$, $N_b$, $A_{mn}$, and $B_{mn}$ are constants found by the dynamic characteristic model of the main shaft device.

* * * * *